ns
3,304,074
Patented Feb. 14, 1967

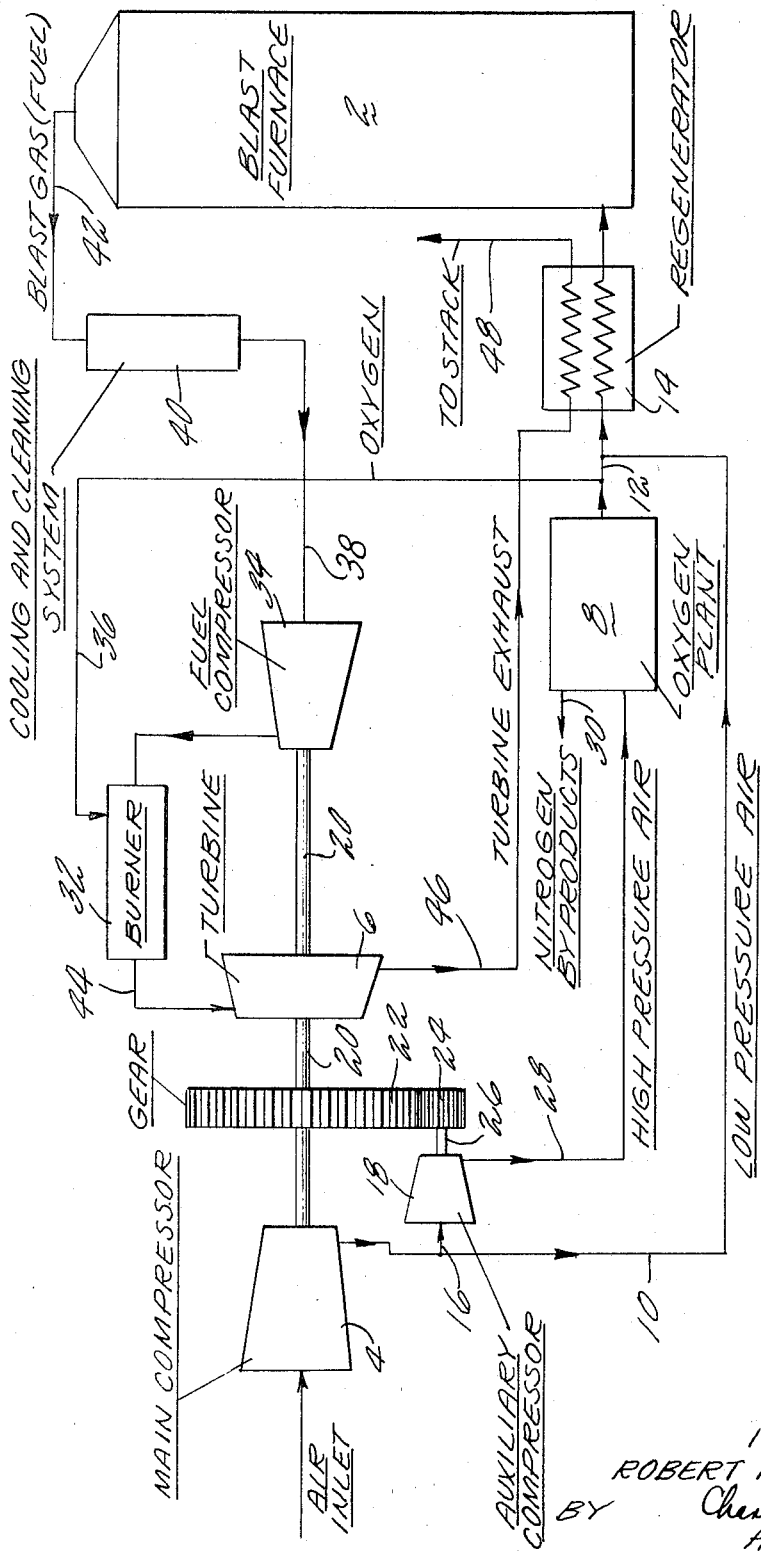

3,304,074
BLAST FURNACE SUPPLY SYSTEM
Robert R. Atherton, North Palm Beach, Fla., assignor to United Aircraft Corporation, East Hartford, Conn., a corporation of Delaware
Filed Oct. 31, 1962, Ser. No. 234,372
9 Claims. (Cl. 266—30)

This invention relates to an air and oxygen supply system for a blast furnace.

The use of a gas turbine engine for supplying hot gas under pressure to a blast furnace is known. It is also known that mixtures of oxygen and air or hot gas enhance the efficiency of the blast furnace. However, one of the problems still presented is an adequate supply of oxygen at low cost under pressure for mixing with air or hot gas for use in the blast furnace. The chief item in establishing the cost of the oxygen is the power, usually electric, required to compress air for delivery to the oxygen producing plant. If the blast furnace is supplied with air or gas from the turbine engine, the oxygen is added to the blast furnace air before it enters the blast furnace. One feature of this invention is the use of a part of the available power from the gas turbine engine for supplying air under pressure to an oxygen plant in which oxygen to be later delivered to the blast furnace is separated from the nitrogen in the air. Another feature is the use of a part of the oxygen from the oxygen plant for improving the combustion in the turbine engine.

One feature of the invention is the use of exhaust gas or blast gas from the furnace as the fuel for the gas turbine engine with the turbine supplying motive power for compressing this blast gas to the necessary pressure for delivery into the combustion chamber for the turbine engine.

Other features and advantages will be apparent from the specification and claims, and from the accompanying drawing which illustrates an embodiment of the invention.

The single figure is a diagrammatic view of an arrangement for supplying gas and air to a blast furnace.

In the arrangement shown the blast furnace 2 is supplied with a mixture of oxygen and air which has been raised to a suitable pressure and temperature for efficient operation of the glast furnace. Air under pressure is supplied from a compressor 4 driven by a turbine 6 and the oxygen is supplied from an oxygen plant 8. The air under pressure from the compressor passes through a conduit 10 and feeds into the conduit 12 which carries oxygen from the oxygen plant into a regenerator 14 and thence into the tuyeres of the blast furnace.

The oxygen plant 8 is of conventional construction in which high pressure air is separated into oxygen and nitrogen and other components of air. The system for separating high pressure air into its components is old and well known. The regenerator 14 is a conventional heat exchanger.

The main compressor is large enough to supply more than enough air to mix with the oxygen for the blast furnace so that part of the air from the compressor 4 is directed through a conduit 16 to an auxiliary compressor 18 also driven by the turbine 6. In the arrangement shown a shaft 20 on which the compressor 4 and turbine 6 are both mounted carries a gear 22 in mesh with a gear 24 on the shaft 26 for the auxiliary compressor. This auxiliary compressor increases the pressure of the air to the required high pressure for efficient operation of the oxygen plant and the high pressure air from the auxiliary compressor is delivered by a conduit 28 to the plant. A suitable conduit 30 directs nitrogen and other by-products from the oxygen plant to a suitable collecting device, not shown, since these by-products are salable.

The turbine 6 is powered by hot gas from a burner 32, the latter being supplied by fuel from a fuel compressor 34 and by oxygen from a conduit 36 which takes oxygen from the discharge conduit 12 of the oxygen plant. The intake of the fuel compressor 34 is connected by a conduit 38 to a gas cooler and cleaner device 40 which receives the hot gas under pressure discharging from the blast furnace through a conduit 42. This gas has sufficient combustible material therein to combine with the oxygen in the burner 32 to raise the temperature of the combined oxygen and discharge gas entering the turbine to a suitable temperature for efficient operation. The discharge of the burner 32 is connected by a duct 44 to the turbine inlet.

The turbine discharges through an exhaust conduit 46 which carries the turbine exhaust gas through the regenerator 14 with the turbine exhaust gas then discharging through conduit 48 into the atmosphere. In this way the air and oxygen delivered to the furnace air inlets is heated to the desired temperature by the turbine exhaust gas. The compressor 34 is also mounted on the same shaft 20 that supports the turbine and main compressor so that this fuel compressor is also driven by the turbine 6.

The cleaner and cooler 40 is conventional in arrangement being essentially an arrangement by which impurities (solid particles) are removed from the blast gas and by which the gas is cooled to a temperature suitable for admission to the fuel compressor.

It will be apparent that with this arrangement the gas turbine assembly may be utilized to provide both the high pressure air for the blast furnace and the higher pressure air for the oxygen plant, and in addition may be utilized to increase the pressure of the fuel (the blast gas) high enough so that it will feed into the burner for burning with oxygen under pressure to power the turbine.

It will be understood that the oxygen plant is a conventional adjunct to a blast furnace. It will be further understood that the compressor and turbine may consist of the conventional gas turbine engine used for aircraft powerplants with the addition of driving means for the auxiliary air compressor and fuel compressor.

It is to be understood that the invention is not limited to the specific embodiment herein illustrated and described, but may be used in other ways without departure from its spirit as defined by the following claims.

I claim:

1. The combination with a blast furnace or the like having air inlets to which gas under pressure is admitted, and an exhaust stack, and an oxygen producing plant, of a gas turbine engine having a main compressor and turbine, said turbine driving said compressor, means for delivering air from said main compressor to the blast furnace inlets, an auxiliary compressor driven by the turbine and supplying air to the oxygen producing plant, means for combining a part of the oxygen from the oxygen producing plant with the air from the main compressor upstream of the furnace air inlets, means including a combustion chamber to which additional oxygen from the oxygen producing plant is delivered for supplying hot gas under pressure to the turbine, and means for delivering fuel to said combustion chamber to burn with the oxygen for heating the fuel and the additional oxygen to power the turbine.

2. The combination as in claim 1 in which a regenerator is provided for heating the air from the main compressor and the oxygen from the oxygen producing plant mixed therewith by the exhaust gas from the turbine.

3. The combination as in claim 1 in which the fuel used is gas discharging from the blast furnace.

4. The combination as in claim 3 in which a fuel compressor driven by the turbine raises the pressure of the fuel gas to the necessary pressure for discharge into the combustion chamber.

5. The combination as in claim 4 in which a regenerator is provided for heating the air from the main compressor and the oxygen mixed therewith by gas exhausting from the turbine before the compressor air reaches the furnace.

6. The combination as in claim 1 in which the auxiliary high pressure compressor driven by the turbine receives a part of the compressed air from the main compressor and delivers it to the oxygen plant at a pressure suitable for use therein.

7. The combination with a blast furnace or the like having air inlets and an exhaust stack and an oxygen producing plant of a gas turbine engine having a main compressor and turbine, said turbine driving said compressor, and an auxiliary high pressure compressor for supplying air under pressure to said oxygen plant, said auxiliary compressor also being driven by said turbine, means for delivering air from said main compressor to the blast furnace inlets and to the inlet of the auxiliary compressor, means for delivering air from the auxiliary high pressure compressor to the oxygen producing plant, means for delivering a part of the oxygen from the oxygen producing plant to said inlets, means including a combustion chamber for receiving the remainder of the oxygen from the oxygen plant and means for delivering fuel to said combustion chamber to burn with the oxygen in said chamber, the combustion chamber outlet being connected to the turbine inlet to provide hot gas for powering the turbine.

8. The combination as in claim 7 in which a regenerator heats the compressor air and oxygen before it enters the furnace inlets, the regenerator being supplied with heat from the exhaust gas of the turbine.

9. The combination as in claim 7 in which the fuel used is gas from the blast furnace stack.

References Cited by the Examiner
UNITED STATES PATENTS

| | | | |
|---|---|---|---|
| 1,445,973 | 2/1923 | Roberts et al. | 266—30 |
| 2,079,019 | 5/1937 | Karwat | 75—41 |
| 2,701,443 | 2/1955 | Sedille | 60—39.12 |

JOHN F. CAMPBELL, *Primary Examiner.*

JAMES H. TAYMAN, Jr., *Examiner.*

R. F. DROPKIN, *Assistant Examiner.*